United States Patent [19]

Allen

[11] 4,333,983
[45] Jun. 8, 1982

[54] OPTICAL ARTICLE AND METHOD

[75] Inventor: Thomas H. Allen, Santa Rosa, Calif.

[73] Assignee: Optical Coating Laboratory, Inc., Santa Rosa, Calif.

[21] Appl. No.: 143,592

[22] Filed: Apr. 25, 1980

[51] Int. Cl.³ .......................... B32B 27/06; G02B 5/28
[52] U.S. Cl. ..................... 428/336; 428/480; 428/696; 428/701; 427/164; 427/207.1; 427/419.2; 427/419.8; 350/166
[58] Field of Search ............ 427/164, 163, 162, 296, 427/419.8, 207.1, 253, 419.2; 428/480, 539, 336, 696, 701, 702; 350/164, 166, 1.5, 1.6

[56] References Cited

U.S. PATENT DOCUMENTS

| | | | |
|---|---|---|---|
| 2,628,927 | 2/1953 | Colbert et al. | 428/409 X |
| 3,034,924 | 5/1962 | Kraus et al. | 427/166 |
| 3,185,020 | 5/1965 | Thelen | 350/164 |
| 3,356,522 | 12/1967 | Libbert | 350/164 X |
| 3,356,523 | 12/1967 | Libbert | 350/164 X |
| 3,362,848 | 1/1968 | Hamilton | 427/164 X |
| 3,432,225 | 3/1969 | Rock | 350/164 |
| 3,604,784 | 9/1971 | Louderback et al. | 350/164 |
| 3,682,528 | 8/1972 | Apfel et al. | 427/160 X |
| 3,793,022 | 2/1974 | Land et al. | 350/164 X |

*Primary Examiner*—John D. Smith
*Assistant Examiner*—Bernard F. Plantz
*Attorney, Agent, or Firm*—Flehr, Hohbach, Test, Albritton & Herbert

[57] ABSTRACT

A flexible polymer substrate coated with an aluminum oxide thin film of an optimum adherent thickness of at least about 170 nanometers, with a final optical coating of preselected design formed on the aluminum oxide film.

16 Claims, 11 Drawing Figures

OPTICAL ARTICLE AND METHOD

This invention relates generally to articles having optical coatings thereon and, more specifically, to a flexible polymer substrate with an optical coating thereon.

Generally, the major thrust of the optical coating technology has been the formation of optical coatings on rigid substrates to produce a final manufactured item or a component which is then shipped to a customer to assemble into a final product. For products which require a very high performance optical coating, there is generally no substitute for producing the optical coating directly on the article in a vacuum chamber. Since few companies have the capability of producing high quality optical coatings, this usually requires that the article or component be shipped to a specialty optical coating company to be coated and then returned to the manufacturer.

There are, however, a number of applications for optical coatings which do not require very high performance optical coatings. For these product applications, the logistics of sending the article back and forth between the manufacturer and the specialty optical coating house ofttimes precludes the use of optical coating technology where it might improve product performance or appearance or have other advantages. Furthermore, in a number of instances, the configuration of the product which could benefit from an optical coating is such that formation of a coating directly thereon in a vacuum deposition chamber is very difficult and would be too expensive to justify the cost of producing the coating thereon. For optical coating applications which do not require a very high performance optical coating, it would be convenient to supply the optical coating on a flexible transparent substrate which can then be attached directly to the product using an appropriate adhesive material. One of the significant problems of providing an optical coating on a flexible polymer substrate is the difficulty of achieving sufficient adherence between the optical coating and the surface of the substrate. It is generally known that the adherence of many of optical coating materials to a polymer substrate surface is much too poor to make a direct coating on film a commercially acceptable product from a durability standpoint.

The art has generally recognized that oxides of silicon and metal oxides can be utilized as an adhesive layer on polymer substrates to improve the adherence of optical coating materials to the surface. This constitutes an extension of the general knowledge in the art that various metal oxides can be utilized to improve the adherence of thin films to substrates such as glass. In particular, metal oxides in very thin layers have been used to improve the adherence of thin metal films on glass substrates. A typical example of this prior art approach is set forth in Colbert et al. U.S. Pat. No. 2,628,927 which discloses the use of various thin metal oxide and sulfide layers as adhesive layers for an optical coating comprising a thin metal film. The metal oxide adhesive layers in the Colbert et al. patent are generally only a few Angstroms thick up to about one hundred Angstroms thick.

Libbert U.S. Pat. Nos. 3,356,522 and 3,356,523 disclose the use of silicon oxide as an adhesive layer for magnesium fluoride anti-reflection coatings on polymer substrates of polycarbonate and polystyrene. In the most general case, the Libbert U.S. Pat. Nos. 3,356,522 and 3,356,523 disclose the use of a silicon oxide layer which has a quarter wave optical thickness as the adhesive layer under the magnesium fluoride antireflection coating. While the use of a quarter wave layer of silicon oxide provides a reasonably satisfactory adhesive coating for causing a magnesium fluoride antireflection layer to adhere to a polymer substrate, there is room for improvement in coating durability by providing even stronger adherence of optical coatings to the surfaces of polymer substrates than can be achieved with a layer of silicon oxide. Improved adherence of optical coatings on flexible polymer substrates should produce additional product applications where a more durable optical coating is required.

Another approach that has previously been taken to providing a durable optical coating on a polymer substrate is the technique used comercially by Optical Coating Laboratory of Santa Rosa, Calif., and taught in Mussett U.S. patent application Ser. No. 48,035 filed June 22, 1970 (now abandoned). A massively thick layer of silicon oxide is utilized on a rigid polymer substrate by Mussett in order to provide for increased durability of the optical coating formed thereon, for example, a antireflection coating. According to the Mussett approach, the use of a layer of silicon oxide many quarter waves thick will produce a very durable optical coating which is fairly strongly adherent to the polymer substrate. It is believed that the durability in the Mussett structure is principally due to the thickness of the silicon oxide coating which virtually forms a passivating glass layer over the softer polymer surface. It is believed that the use of a massively thick silicon oxide layer on a flexible polymer substrate would not provide a satisfactory solution because the thick silicon oxide layer would tend to craze as the film is subjected to flexure during shipment or use. In addition, the high cost of producing a thick silicon oxide layer on a polymer substrate makes that approach commercially unattractive. In particular, in apparatus for coating rolls of flexible substrate, the requirement to produce a massive coating on the substrate would consume an inordinate amount of manufacturing time since the substrate would have to go through many deposition cycles to produce the thick coating.

Accordingly, it is a principal object of this invention to provide an improved optical coating on flexible polymer substrates.

More specifically, it is an object of this invention to provide an improved adhesive layer for optical coatings formed on flexible polymer substrates.

It is another object of this invention to provide an improved method for forming highly adherent optical coatings on flexible polymer substrates.

In accordance with this invention, it has been surprisingly discovered that a layer of aluminum oxide formed on a flexible polymer substrate to a thickness at least approximately 170 nanometers provides an optimized adhesive layer for optical coatings later deposited thereon. Accordingly, this invention features a transparent flexible polymer substrate carrying on at least one surface thereof a first thin film layer of aluminum oxide formed to a thickness of at least about 170 nanometers and an optical coating comprising at least a second thin film layer formed on said first layer and having preselected optical properties.

In one specific embodiment, the optical coating is an antireflection coating comprising at least one layer of a transparent dielectric material having a refractive index approximately equal to the square root of the refractive index of the substrate and being formed to an optical thickness substantially equal to an odd integral multiple of a quarter wave at a preselected design wave length.

In a preferred embodiment, the polymer substrate comprises polyethylene terephthalate, commonly sold under the name Mylar, which has an index of refraction of about 1.64, and the optical coating comprises a single layer of magnesium fluoride having a refractive index of about 1.38 and formed to an optical thickness equal to a quarter wave at a design wave length in the range of about 500 to 600 nanometers.

In another aspect, this invention features a transparent flexible polymer substrate carrying on each of the top and bottom surfaces thereof a first thin film layer of aluminum oxide formed to a thickness of at least about 170 nanometers and an optical coating comprising at least a second thin film layer formed on said first layer and having a preselected optical properties.

In accordance with another aspect of this invention, a method of forming a highly adherent optical coating on a flexible polymer substrate is provided and comprises the steps of disposing a flexible polymer substrate in a vacuum deposition chamber, depositing a layer of aluminum oxide on at least one surface of the substrate to a thickness of at least about 170 nanometers, and depositing an optical coating on the layer of aluminum oxide.

While the invention preferably employs the use of a layer of aluminum oxide on a polyethylene terephthalate substrate, the optimized aluminum oxide adhesive layer will serve the same purpose of adhering an optical coating to other types of flexible polymer substrates, such as flexible substrates of polycarbonate, nylon, Kapton, and various acrylics. Accordingly, this invention provides the advantage of enabling highly durable optical coatings to be formed in an inexpensive manner on flexible polymer substrates.

An adhesive layer of aluminum oxide at a thickness at least about 170 nanometers thus enables the production of optically coated flexible substrate which have sufficient durability of the optical coating to have commercial utility in a number of areas. For example, where the optical coating formed on the flexible polymer substrate is an antireflection coating, that coating is sufficiently durable to be utilized to reduce reflectance of plastic covers for products such as typewriters and other instruments as well as face panels on cathode ray tubes and on instrument panels for automobiles and aircraft. Antireflection coatings on Mylar could also be used as solar covers to provide high transmittance and low reflectance of solar energy. The Mylar flexible substrate would also serve as a barrier to infrared radiation emitted by the other components of the solar absorber behind the cover. By forming this highly durable optical coating on a flexible polymer substrate, a product manufacturer can simply purchase a roll of the substrate with the optical coating thereon, cut the coated substrate to the desired configuration and then apply it to the article. This results in an inexpensive and efficient way of providing modestly performing optical coatings on a variety of products.

Other objects, features, and advantages of this invention will be apparent from a consideration of the following detailed description in conjunction with the accompanying drawings.

Figure 1:
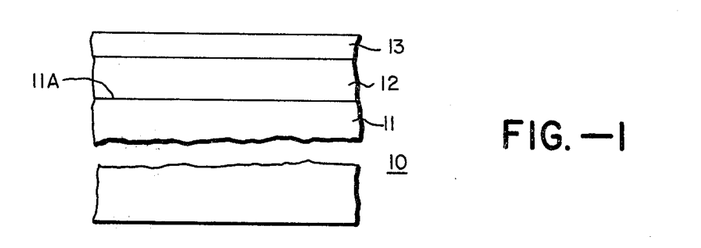
FIG. 1 is a fragmented elevational view of an optical coating and adhesive layer on a flexible polymer substrate in accordance with this invention.

FIG. 1 illustrates one embodiment of this invention in the form of a coated article 10 comprising a flexible polymer substrate 11, a thin film layer of aluminum oxide 12 and a thin film layer of magnesium fluoride 13. The flexible polymer substrate 11 is preferably polyethylene terephthalate (PET) having a thickness of about 3 mils, although other thicknesses could be used. Aluminum oxide layer 12 is formed on surface 11A of flexible substrate 11 by vacuum deposition. In accordance with this invention, the thickness of the aluminum oxide film is preferably at least about 170 nanometers which corresponds to approximately a half wave optical thickness at a design wave length of 560 nanometers. As will later be seen, this minimum thickness value for the aluminum oxide layer is critical in achieving optimum adherence of the magnesium fluoride layer 13. Magnesium fluoride layer 13 serves as an anti-reflection coating and is vacuum deposited on top of aluminum oxide layer 12 to a thickness which is a quarter wave optical thickness at the design wavelength of 560 nanometers. A wavelength of around 560 nanometers is typically selected as the design wavelength of an antireflection coating since it is substantially at the center of the visible spectrum which extends from about 400 to 750 nanometers.

Figure 2:
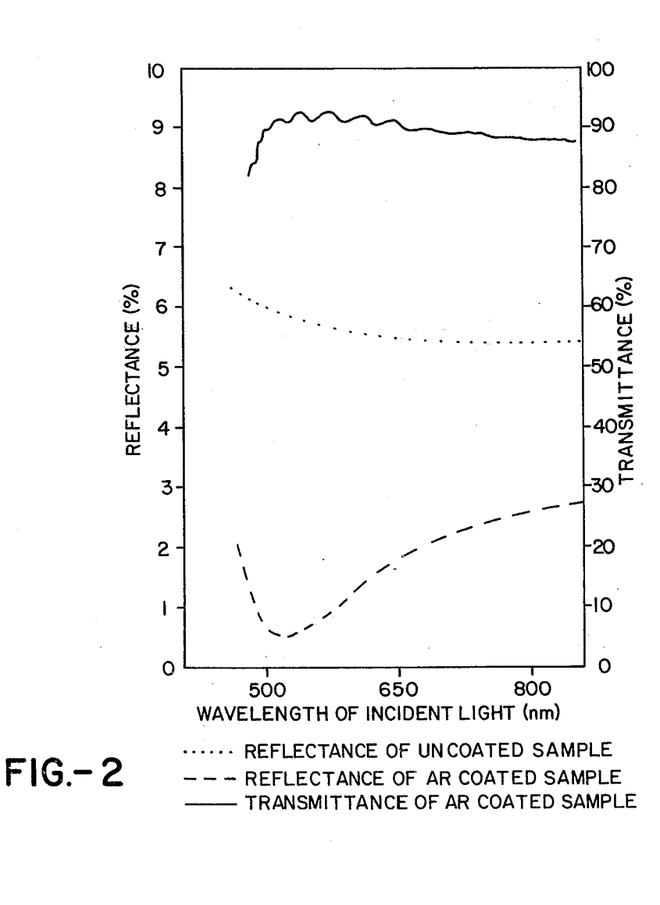
FIG. 2 is a graph showing the reduction in reflectance of the polymer substrate with the antireflection coating formed thereon.

FIG. 2 shows the spectral reflectance and transmittance of both an uncoated PET substrate and a PET substrate with the anti-reflection coating illustrated in FIG. 1. FIG. 2 graphically demonstrates the substantial reduction in percentage reflectance which is achieved by use of the magnesium fluoride antireflection layer on the surface of a PET substrate. As shown, the reflectance of the uncoated substrate is about six percent, whereas that of the coated substrate is substantially under two percent throughout most of the visible spectrum and decreases to about 0.5 percent at the design wavelength of 560 nanometers. FIG. 2 also illustrates that this substantial decrease in reflectance throughout the visible spectrum is obtained without substantial sacrifice in transmittance. While the spectral performance curves shown in FIG. 2 show that the coated substrate depicted in FIG. 1 has a useful anti-reflection properties, the maintenance of this anti-reflection property is highly dependent on the durability of the magnesium fluoride layer 13 on the flexible substrate 11.

As previously indicated, it has been surprisingly discovered that the use of an aluminum oxide adhesive layer 12 of thickness at least 170 nanometers produces a dramatic increase in the adherence of optical coatings on a polymer substrate in comparison to aluminum oxide layers of lesser thicknesses. Demonstration of adhesive strength of optical coatings may be performed in a quantitative fashion utilizing the scratch testing apparatus 20 illustrated in FIG. 3. Scratch testing apparatus 20 utilizes a vacuum chuck 21 which is connected via a hose 21A to a vacuum pump to hold a glass plate 21B with a sample 10 (e.g., the article depicted in FIG. 1) thereon in place on a translation stage 22. Sample 10 may be mounted on the flat glass 21B using double sided tape. Translation stage 22 is driven in a reciprocating fashion by a motor drive 23 preferably at a velocity less than 0.003 cm/sec. Indentor 26 is fabricated from tungsten carbide and has a spherical tip depicted in enlarged cross section in FIG. 4. Indentor 26 is mounted on a fulcrum bar 24 pivoted at point 25 utilizing high quality bearings.

Figure 3:
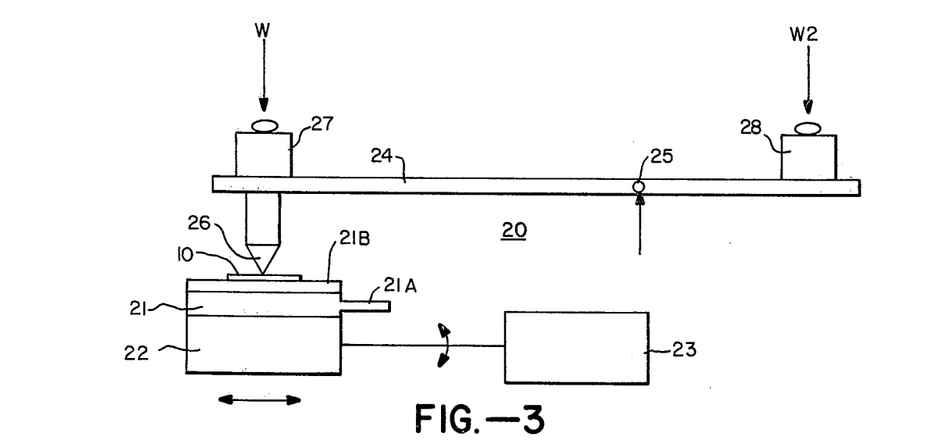
FIG. 3 is a schematic diagram of a scratch testing apparatus utilized to determine the relative adherence of various adhesive layers.

A tare weight 28 ($W_2$) is mounted on one end of the fulcrum arm 24 to counterbalance the weight of the indentor 26 to provide an initial zero balance for the indentor to an accuracy of plus or minus 0.15 grams. Scratch testing can then be accomplished by making a series of scratches increasing the load weight 27 (W) over a range from about 10 to 220 grams. The individual scratches made with these weights may then be examined under a optical microscope equipped with a filar eye piece to measure the scratch width and to determine at which scratch width there is evidence of coating failure. By determining the width of the scratch at the particular weight for which coating failure appears, it is possible to compute the shear stress of the coating. This computation can be made in accordance with the following experimental technique.

If a hard spherical indentor is mechanically loaded against a much softer surface, such as that of PET, the surface will be deformed in a predictable manner. The deformation can either be elastic or nonelastic depending on the magnitude of the mechanical load on the indentor. Since an elastically deformed surface will revert back to its original form when the load is removed, a permanent scratch will result only if the surface is nonelastically deformed. The threshold force, W, required to produce nonelastic deformation is given by the following equation:

$$W = (13.1) P_1^3 r^2 (1/E_1 + 1/E_2)^2, \quad (1)$$

where $P_1$ is equal to 0.4 times the hardness of the uncoated PET, r is the radius of the indentor, and $E_1$ and $E_2$ are the moduli of elasticity of the indentor and PET, respectively. The modulus of elasticity of the tungsten carbide indentor is $4.8 \times 10^{11}$ Pa, and the modulus for PET is $4.6 \times 10^9$ Pa. Utilizing a measured hardness value for PET of 1500 kg/cm$^2$ the computed value of W for PET is 0.1 gram. All the loads used for scratch testing, i.e., 10 to 200 grams, were well beyond this 0.1 gram threshold.

Figure 4:
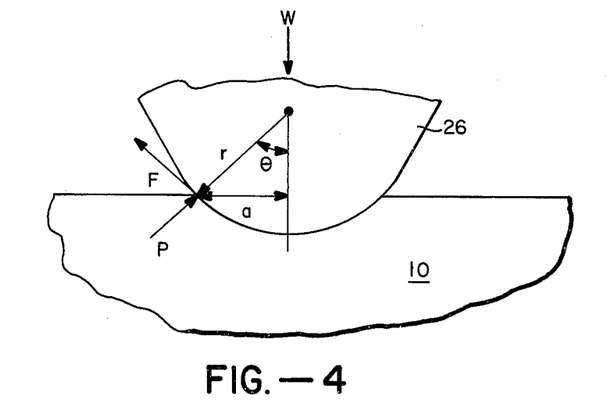
FIG. 4 is an enlarged diagram of a portion of the apparatus shown in FIG. 3, useful in explaining the theory of the scratch test method.

The hardness of the uncoated substrate, P, used in equation (1) is given by the following equation:

$$P = W/\pi a^2,$$

where a is the radius of the contact circle as shown in FIG. 4, and w is the mechanical load on the indentor. In scratch testing of surfaces, it is assumed that the presence of an optical coating on the surface does not contribute to the mechanical properties of the substrate, so the width of the scratch is determined only by the load and the hardness of the substrate. As the substrate surface is deformed by the indentor, the coating between these two surfaces is exposed to both shear and tensile stresses generated by the deformation process. The magnitude of the shear stress is at a maximum at a point where the surface of the substrate intersects the edge of the indentor. If the force at the interface generated by this shear stress across the coating is larger than the adhesive bond at the interface, adhesive failure of the coating occurs and the coating is removed by the wiping action of the indentor. The magnitude of the shear stress, F, can then be determined utilizing the following equation:

$$F = aP/(r^2 - a^2)^{\frac{1}{2}}$$

where a is the radius of the contact circle (also equal to the half width of the scratch), and r is the indentor radius which, in exemplary apparatus depicted in FIG. 3, was 100 microns.

Figure 5:
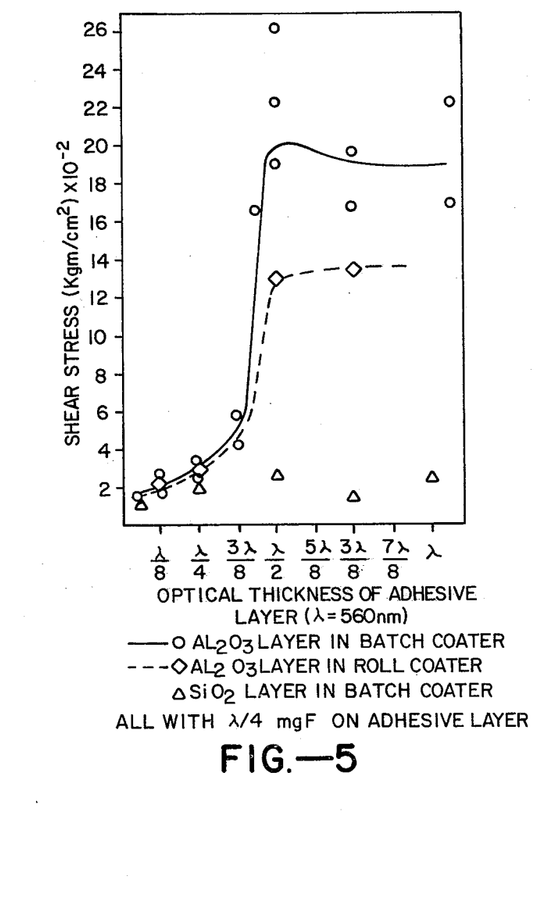
FIG. 5 is a graph which shows the adherence of optical coatings on layers of aluminum oxide and silicon oxide formed to different thicknesses.

Utilizing this scratch testing apparatus and the analytic method previously described, scratch tests were performed on a variety of optical coatings comprising a quarter wave magnesium fluoride layer on adhesive layers of various materials and material thicknesses. FIG. 5 graphically demonstrates the results of this scratch testing for various thicknesses of silicon oxide and for various thicknesses of aluminum oxide with the aluminum oxide layers formed both in a batch-type coater and in a prototype roll coater. As depicted in FIG. 5, the maximum shear stress which can be sustained by an optical coating utilizing a silicon oxide adhesive layer increases only slightly as the layer thickness increases from an eighth wave optical thickness to a full wave optical thickness at a wavelength of 560 nanometers. In contrast to this, the maximum shear stress which could be withstood by an adhesive layer of aluminum oxide of various thicknesses dramatically increased at the half wave optical thickness at a wavelength of 560 nanometers which corresponds to a physical thickness of about 170 nanometers.

As illustrated in FIG. 5, the maximum shear stress which the coating could withstand essentially peaks at the half wave optical thickness of the aluminum oxide layer both for layers formed in a batch coater and in a roll coater. However, the maximum shear stress sustainable by the aluminum oxide layer formed in the roll coater was somewhat less than that in the batch coater because of the higher rate of deposition utilized in the roll coater. It is apparent, however, from the results of these experiments that a half wave optical thickness of aluminum oxide at the design wavelength of 560 nanometers (or a thickness of 170 nanometers) constitutes a highly optimized adhesive layer thickness which results in the maximum adherence of the optical coating to the flexible polymer substrate. A variety of other metal oxides were tested in a similar fashion and none of them showed the type of surprising increase in adhesive strength at any particular layer thickness that was demonstrated in the aluminum oxide layer. Moreover, none of the other metal oxide layers tested exhibited the level of adhesive strength which was shown by the aluminum oxide layers. Accordingly, it is concluded that maximum optical coating adherence on polymer substrates, and thus the maximum coating durability, can be achieved by use of an aluminum oxide adhesive layer at a thickness of at least approximately 170 nanometers.

The reason for this dramatic increase in the adhesive strength of an aluminum oxide layer at the thickness value of about 17 nanometers is not well understood at this time. It is believed that this phenomena is associated with the columnar structure of a vapor deposited aluminum oxide layer. Whatever the explanation, the discovery of this dramatic increase in adhesive strength at this thickness of aluminum oxide results in the capability to form highly adherent optical coatings on flexible polymer substrates.

While the principles of this invention have been illustrated in accordance with an exemplary embodiment utilizing a PET substrate this same phenomena of peak adherence of aluminum oxide adhesive layers can also be utilized on other types of flexible polymer substrates such as polycarbonates, nylon, Kapton, and various acrylics where the same bonding force phenomena would pertain. Although this adhesive layer approach could also be used on these other polymer substrates, it is believed that the preferable substrate is PET due to the closeness in index of refraction between aluminum oxide and PET. Aluminum oxide has an index of refraction of about 1.63, whereas PET has an index of refraction of about 1.64. The other materials mentioned above generally have refractive indices of around 1.5. Consequently, the aluminum oxide adhesive layer on PET is essentially passive from an optical standpoint due to the matching of the indices of refraction. This would not be true of other substrate materials. This optical passivity of the aluminum oxide layer enables that adhesive layer to be utilized without taking it into account in designing the optical coating structure to be formed over the optimized aluminum oxide adhesive layer.

While the basic principles of this invention have been illustrated using a single layer of magnesium fluoride as shown in FIG. 1 to produce an antireflection coating on PET film, it should be understood that numerous other types of optical coatings could be produced on the PET film utilizing the highly adherent aluminum oxide layer of thickness of 170 nanometers. For example, other types of antireflection coatings such as those which are shown in Thelan U.S. Pat. No. 3,185,020 and Rock U.S. Pat. No. 3,432,225 could also be used in place of the single layer of magnesium fluoride. However, a single layer of magnesium fluoride is generally preferred where only modest optical properties are required since it can be readily formed on the PET substrate.

In addition, it should be understood that optical coatings having performance characteristics other than antireflection characteristics could also be employed on the flexible polymer substrate utilizing the optimized aluminum oxide adhesive layer in accordance with this invention. For example, the infrared interference filter disclosed in the Apfel et al. U.S. Pat. No. 3,682,528 could be utilized as the optical coating formed on the optimized aluminum oxide adhesive layer formed on the flexible polymer substrate. Other types of optical coatings which could be employed in this invention are the coatings disclosed in a copending Ash application, Ser. No. 108,004, filed Dec. 26, 1979. In particular, the hot mirror and cold mirror type of optical coatings disclosed in the copending Ash application and the decorative dichroic coatings taught therein could be utilized in connection with this invention. Finally, it should be understood that this invention could employ simply a metal reflective layer on top of the optimized aluminum oxide layer on the flexible polymer substrate to provide a highly reflective optical coating where a mirror-like appearance is desired.

Figure 6:
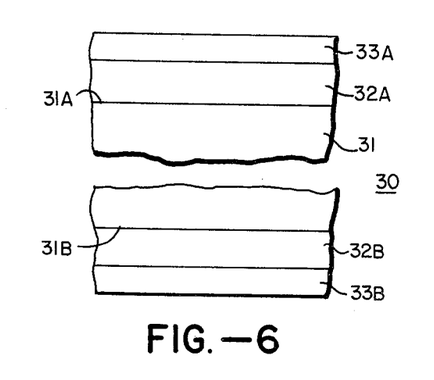
FIG. 6 is a fragmented elevational view of a flexible polymer substrate with adhesive layers and optical coatings on both surfaces.

FIG. 6 illustrates a coated article 30 in which optical coatings are formed on both top and bottom surfaces 31A and 31B of a flexible polymer substrate 31. The coating on each of the surfaces comprises a first layer of aluminum oxide 32A, 32B, having the optimum thickness of at least about 170 nanometers. The next layers formed on the two surfaces are the magnesium fluoride antireflection coating 33A and 33B. Again, these magnesium fluoride layers are formed to a thickness which is a quarter wave optical thickness at the design wavelength of 560 nanometers.

Figures 7, 9:
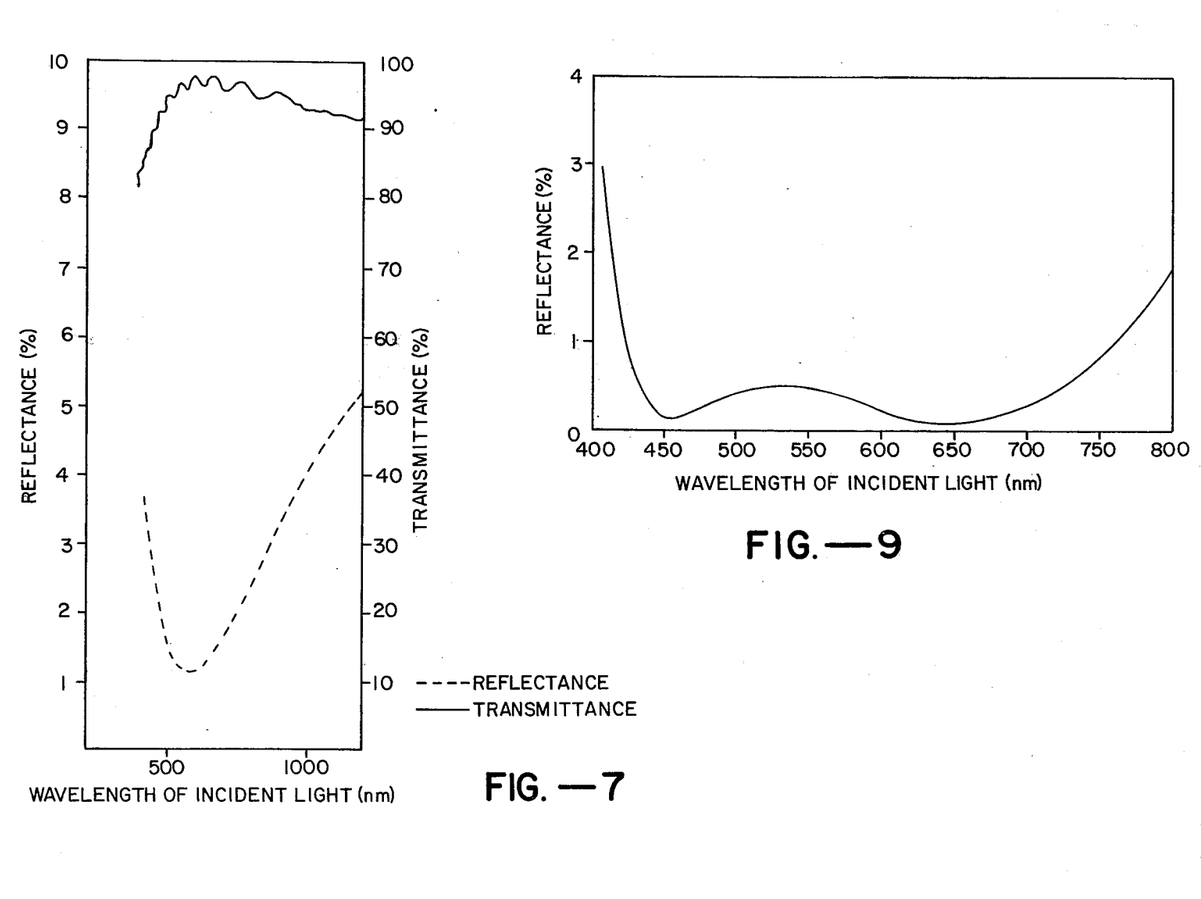
FIG. 7 is a graph of the spectral performance of the article depicted in FIG. 6.
FIG. 9 is a graph showing the spectral reflectance of the article depicted in FIG. 8.

FIG. 7 shows the spectral reflectance and transmittance characteristics of the article 30 depicted in FIG. 6. Comparing the spectral reflectance characteristics as shown in FIG. 7 with those for the single sided coating shown in FIG. 2, it will be seen that the reflectance of the dual side coating is somewhat higher than that of the single sided coating. However, the reflectance is still under three percent throughout the major portion of the visible spectrum and this is sufficient antireflection performance for product applications where the dual coated substrate would be advantageous.

Figure 8:
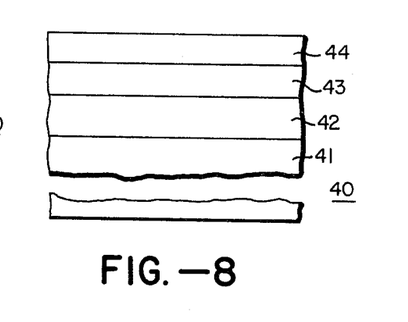
FIG. 8 is an alternative embodiment of this invention utilizing a two-layer antireflection coating.

FIG. 8 illustrates an article 40 which utilizes a two layer antireflection coating. In this case, the flexible substrate 41 has an initial layer 42 of aluminum oxide formed thereon, and the layers 43 and 44 formed on the aluminum oxide layer comprised the antireflection coating. Aluminum oxide layer 42 is formed to the optimum adhesive thickness of at least about 170 nanometers. The first layer 43 of the antireflection coating is preferably a layer of material which has a index of refraction of about 1.89 and is preferably formed to a thickness equal to a half wave optical thickness at the design wavelength. In actually producing an example of article 40, the first layer 43 of the antireflection coating was formed utilizing a mixture of aluminum oxide having an index of refraction of 1.63 and another material having an index of refraction of about 2.1. The composition of this second material is generally as set forth in Kraus et al. U.S. Pat. No. 3,034,924. In addition, there are a number of metal oxides which have an index of refraction of about 2.1 (e.g., zirconium oxide) and could be utilized in a mixture with aluminum oxide to form this layer. The final layer 44 of the antireflection coating is a quarter wave layer of magnesium fluoride.

FIG. 9 depicts the spectral reflectance of the article 40 depicted in FIG. 8. As shown, the reflectance of the dual layer antireflection coating is substantially lower throughout the visible spectrum than the corresponding reflectance for a single layer antireflection coating as depicted in FIG. 2.

Figure 10:
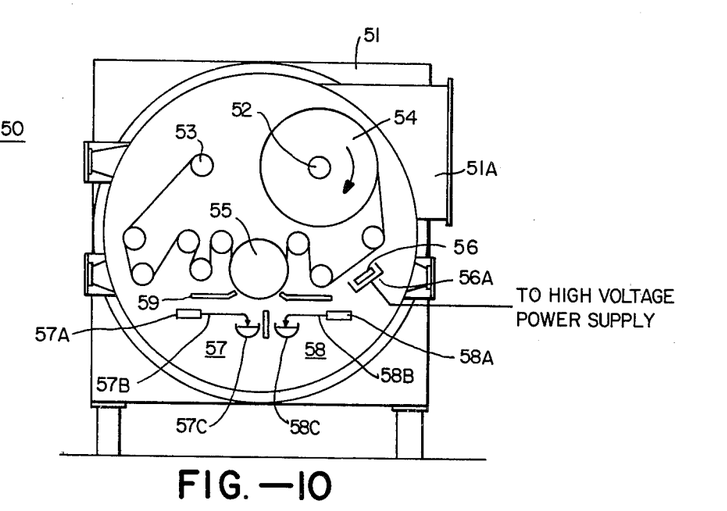
FIG. 10 is a schematic diagram showing the features of a roll coating apparatus useful in accordance with this invention.

FIG. 10 illustrates one type of roll coating chamber 50 which is the preferable type of apparatus from a cost standpoint for forming thin films on flexible polymer substrates. The roll coating apparatus 50 includes a vacuum chamber 51 which is evacuated via a port 51A. Inside vacuum chamber 51 are a supply roll 52 and a take-up roll 53. Carried on supply roll 52 is a coil 54 of polymer substrate. The supply and take-up rolls are driven in a servo fashion in order to maintain constant linear velocity of the flexible substrate as it passes through the deposition chamber. As depicted, the substrate from supply roll 52 passes over a set of rollers and then comes in contact with chill drum 55. After passing over chill drum 55, another set of rollers is provided to guide the substrate onto the takeup roll 53. Some of these rollers are simply idler rollers and others are tension adjusting rollers to maintain even tension on the flexible material. Chill drum 55 may be maintained at ambient temperature or at lower-than-ambient temperature by the circulation of fluids through the drum. The chill drum is utilized in order to cool the flexible substrate as hot material and emitted radiation from the deposition sources impinges thereon to avoid disintegration due to overheating.

Also included within the vacuum chamber 51 is a glow discharge electrode 56 which is surrounded by a shield 56A. The glow discharge electrode 56 is connected to a high voltage power supply (not shown) outside the deposition chamber. This glow discharge electrode 56 is utilized to bathe the flexible film passing nearby in a plasma of ionized gases. This plasma of ionized gases is created by bleeding sufficient oxygen into the chamber or utilizing residual gases in the chamber which are ionized under the effect of the electric field from the electrode 56 and create a localized plasma in the vicinity of that electrode. The flexible film passing through that localized plasma undergoes a bombardment of ions and electrons which conditions the surface for deposition of coating material thereon.

Also included within vacuum chamber 51 are a pair of electron beam sources 57 and 58. One of these electron beam sources is utilized to deposit aluminum oxide and the other to deposit magnesium fluoride. Each of the electron gun deposition sources 57, 58 includes an electron gun 57A, 58A which provides a beam of electrons 57B, 58B which are bent in a magnetic field (not shown) and impinge on the surface of source material in source crucibles 57C, 58C. Generally, these electron gun deposition sources also include a supply of material which is automatically fed into the source crucible as the material already therein is used up during the deposition process. A mask arrangement 59 is provided to limit the deposition of the material to a relatively narrow region of the flexible film in contact with chill drum 55. This minimizes the angle of deposition of the material on the flexible substrate in order to maintain uniform thin film characteristics.

Other types of roll coating apparatus could be used. For example, separate chill drums could be utilized with each electron gun deposition source. In a large scale roll coater for depositing more complex optical coatings, using more layers of different materials, three or more deposition sources, each associated with a separate chill drum, could be employed.

Figure 11:
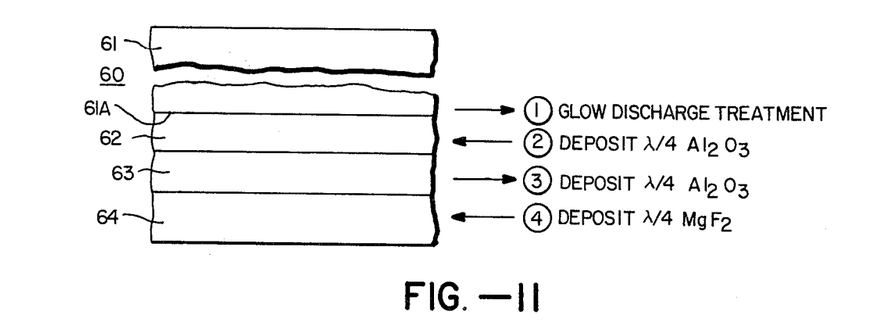
FIG. 11 is a fragmented elevational view of a flexible polymer substrate with an optical coating formed thereon in accordance with a preferred coating method performed in a roll coating apparatus.

FIG. 11 illustrates a currently preferred method of forming the optical coatings on a flexible polymer substrate in a roll coating apparatus such as that depicted in FIG. 10 or the other types mentioned above. FIG. 11 shows an optically coated article 60 comprising a flexible substrate 61 and three thin film layers 62, 63 and 64 formed thereon. Layers 62 and 63 are quarter wave layers of aluminum oxide (at 560 nanometers), and layer 64 is a quarter wave layer of magnesium fluoride. FIG. 11 also depicts the preferred sequence of steps of forming this optical coating structure in the roll coating apparatus of FIG. 10. As shown, the first step is to subject the flexible substrate 61 to a glow discharge treatment to condition the surface 61A for the deposition of aluminum oxide. This is performed by a first pass of the polymer substrate through the deposition chamber while the glow discharge electrode 56 shown in FIG. 10 is active, causing the substrate surface to be bathed in a plasma of ionized gases.

The second step then is to run the flexible substrate through the coating area of the deposition chamber a second time, while activating the electron beam source of aluminum oxide to deposit a quarter wave layer of aluminum oxide of the surface 61A of flexible substrate 61. Thereafter, the substrate is then run through the coating area of the chamber again while the aluminum oxide source remains active to deposit another quarter wave layer of aluminum oxide. The reference to the quarter wave layer here again is a reference to a design wavelength of 560 nanometers, and consequently, the actual physical thickness of the two aluminum oxide layers is about 85 nanometers each. The fourth step in the process then is to pass the flexible substrate through the coating area of the chamber a fourth time, while activating the magnesium fluoride source to deposit a quarter wave layer of magnesium fluoride. All of these steps are done in sequence without breaking vacuum. Of course, other final coatings can be created on the optimized aluminum oxide adhesive layer by using other materials in the source crucible.

In addition to the quantitative determination of improved coating adherence from a scratch durability standpoint, tests were also run on coated PET films incorporating the optimum aluminum oxide adhesive layer to determine the rub durability thereof. The results of such tests showed that the rub durability is improved at the optimum aluminum oxide layer thickness, although the increase is not as large as demonstrated with the more severe scratch durability testing previously discussed. Samples of antireflection coatings on flexible polymer substrates using the optimum aluminum oxide adhesive layer were also subjected to environmental tests utilizing a seventy-two hour humidity-temperature test of a relatively standard type and the samples passed this environmental test. Subsequent to the environmental tests, the same samples were subjected to a standard tape test for adherence and this test was passed as well. It has thus been demonstrated that the use of an aluminum oxide adhesive layer at an optimum thickness value of at least around 170 nanometers results in an optically coated article which has a high degree of both rub and scratch durability and an adhesive strength which enables it to pass environmental tests. Consequently, the use of the optimum aluminum oxide layer thickness will enable the production of optical coatings on flexible polymer substrates which can be used in a reasonably severe commercial environment without degradation of the optical coating over a reasonable lifetime of the product.

This invention will enable the coating of flexible polymer substrates in a high speed roll coating apparatus to produce optical coatings on flexible substrates in a relatively low cost process. A variety of optical coatings can be employed provided the coating design has relatively few layers and is relatively thin. Consequently, modestly performing optical coatings can be produced on flexible polymer substrates utilizing the optimum aluminum oxide adhesive layer and the rolls of optically coated substrate may be shipped directly to a manufacturer to be applied by the manufacturer to its products.

While the invention has been disclosed herein in conjunction with exemplary articles and methods, it should be apparent to those skilled in the art that numerous modifications in the article and method disclosed could be made without departing from the scope of this invention as claimed in the following claims.

What is claimed is:

1. A transparent flexible polymer substrate carrying on at least one surface thereof a thin film adhesion layer of aluminum oxide formed to a thickness of at least about 170 nanometers and an optical coating comprising at least one thin film layer formed on said thin film adhesion layer of aluminum oxide and having preselected optical properties.

2. An article as claimed in claim 1, wherein said optical coating is an antireflection coating comprising at least one layer of transparent dielectric material having a refractive index approximately equal to the square root of the refractive index of said substrate and being formed to an optical thickness substantially equal to an odd integral multiple of a quarter wave at a preselected design wavelength.

3. An article as claimed in claim 2, wherein said polymer substrate comprises polyethylene terephthalate having an index of refraction of about 1.64 and said optical coating comprises a single layer of magnesium fluoride having a refractive index of about 1.38 and formed to an optical thickness of a quarter wave at a preselected design wavelength in the range of about 500 to 600 nanometers.

4. An article as claimed in claim 2, wherein said polymer substrate comprises polyethylene terephthalate having an index of refraction of about 1.64 and said optical coating comprises a first layer of transparent dielectric material having a refractive index of about 1.89 formed on said thin layer adhesion layer of aluminum oxide to an optical thickness equal to a half wave at a preselected design wavelength in the range of about 500 to 600 nanometers and a second layer consisting of magnesium fluoride having a refractive index of about 1.38 formed to an optical thickness equal to a quarter wave at said design wavelength.

5. An article as claimed in claim 4, wherein said first layer of said optical coating comprises a mixture of aluminum oxide having an index of refraction of about 1.63 and a dielectric material having an index of refraction substantially greater than 1.89.

6. A transparent flexible polymer substrate carrying on each of the top and bottom surfaces thereof a thin film adhesion layer of aluminum oxide formed to a thickness at least about 170 nanometers and an optical coating comprising at least one thin film layer formed on said thin film adhesion layer of aluminum oxide and having preselected optical properties.

7. An article as claimed in claim 6, wherein said optical coating is an antireflection coating comprising at least one layer of transparent dielectric material having a refractive index approximately equal to the square root of the refractive index of said substrate and being formed to an optical thickness substantially equal to an odd integral multiple of a quarter wave at a preselected design wavelength.

8. An article as claimed in claim 7, wherein said polymer substrate comprises polyethylene terephthalate having an index of refraction of about 1.64 and said optical coating comprises a single layer of magnesium fluoride having a refractive index of about 1.38 and formed to an optical thickness equal to a quarter wave at a preselected design wavelength in the range of about 500 to 600 nanometers.

9. An article as claimed in claim 7, wherein said polymer substrate comprises polyethylene terephthalate having an index of refraction of about 1.64 and said optical coating comprises a first layer of transparent dielectric material having a refractive index of about 1.89 and formed on said thin film adhesion layer of aluminum oxide to an optical thickness equal to a half wave at a preselected design wavelength in the range of about 500 to 600 nanometers and a second layer consisting of magnesium fluoride having a refractive index of about 1.38 formed to an optical thickness equal to a quarter wave at said design wavelength.

10. An article as claimed in claim 9, wherein said first layer of said optical coating comprises a mixture of aluminum oxide having an index of refraction of about 1.63 and a dielectric material having an index of refraction substantially greater than 1.89.

11. A transparent film of polyethylene terephthalate having an index of refraction of about 1.64 and carrying on at least one surface thereof a thin film adhesion layer of aluminum oxide formed to a thickness of at least about 170 nanometers and an optical coating formed on said a thin film adhesion layer of aluminum oxide.

12. An article as claimed in claim 11, wherein said optical coating is an antireflection coating comprising a single layer of magnesium fluoride formed to an optical thickness equal to a quarter wave at a preselected design wavelength in the range of about 500 to 600 nanometers.

13. A transparent film of polyethylene terephthalate having an index of refraction of about 1.64 and carrying on each of the top and bottom surfaces thereof a first thin film adhesion layer of aluminum oxide formed to a thickness at least about 170 nanometers and an antireflection coating formed on said first thin film adhesion layer of aluminum oxide and comprising at least a layer of magnesium fluoride formed to an optical thickness substantially equal to a quarter wave at a preselected design wavelength in the range of about 500 to 600 nanometers.

14. A method of forming an antireflection optical coating on a flexible polymer substrate comprising the steps of:
disposing a flexible polymer substrate in a vacuum deposition chamber;
depositing a thin film adhesion layer of aluminum oxide on at least one surface of said substrate to a thickness of at least about 170 nanometers; and
depositing an optical coating on said thin film adhesion layer of aluminum oxide.

15. A method of forming an antireflection coating on a film of polyethylene terephthalate having an index of refraction of about 1.64 comprising the steps of:
disposing said film of polyethylene terephthalate in a vacuum deposition chamber;
depositing a thin film adhesion layer of aluminum oxide on at least one surface of said film of polyethylene terephthalate to a thickness of at least 170 nanometers; and
depositing an antireflection optical coating on said thin film adhesion layer of aluminum oxide comprising at least one layer of magnesium fluoride of an optical thickness equal to a quarter wave at a design wavelength in the range of about 500 to 600 nanometers.

16. A method of forming an antireflection coating on a film of polyethylene terephthalate having an index of refraction of about 1.64 comprising the steps of:
 disposing said film of polyethylene terephthalate in a vacuum deposition chamber;
 depositing a thin film adhesion layer of aluminum oxide on one surface of said film of polyethylene terephthalate to a thickness at least about 170 nanometers;
 depositing on said thin film adhesion layer of aluminum oxide a layer of transparent dielectric material having a refractive index of about 1.89 to an optical thickness substantially equal to a half wave at a design wavelength in the range of about 500 to 600 nanometers; and
 depositing on said first layer of dielectric material a layer of magnesium fluoride to an optical thickness substantially equal to a quarter wave at said design wavelength.

* * * * *

UNITED STATES PATENT AND TRADEMARK OFFICE
CERTIFICATE OF CORRECTION

PATENT NO. : 4,333,983

DATED : June 8, 1982

INVENTOR(S) : Thomas H. Allen

It is certified that error appears in the above-identified patent and that said Letters Patent are hereby corrected as shown below:

Claim 4, column 11, line 39, between "thin" and "adhesion" delete "layer" and substitute therefor -- film --.

Signed and Sealed this

Sixteenth Day of November 1982

[SEAL]

Attest:

GERALD J. MOSSINGHOFF

Attesting Officer     Commissioner of Patents and Trademarks